No. 754,982. PATENTED MAR. 22, 1904.
J. A. EDWARDS.
HEATING DEVICE.
APPLICATION FILED JULY 16, 1903.
NO MODEL.
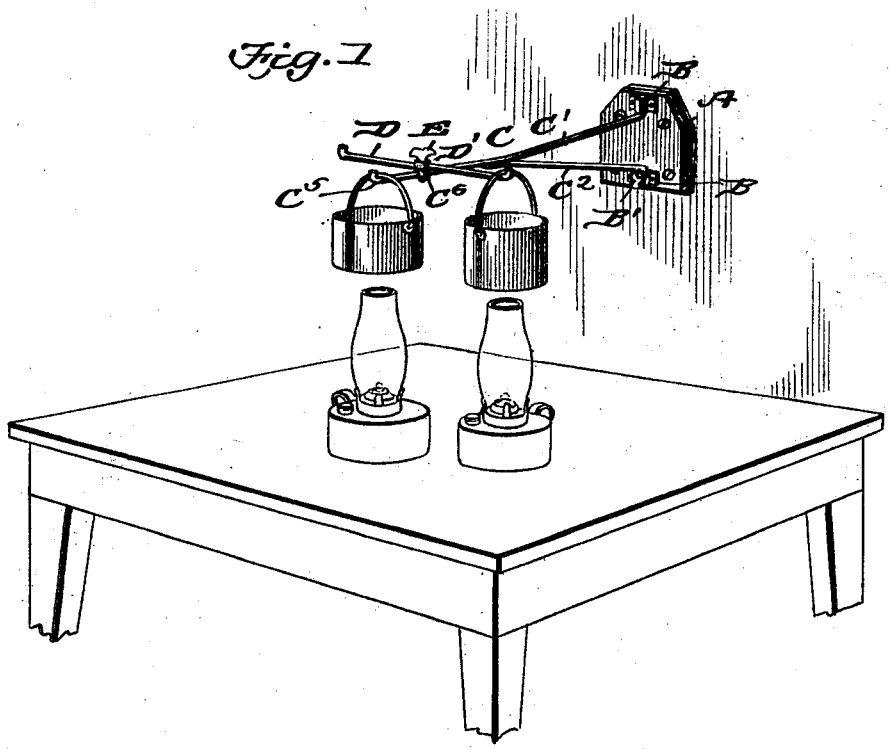
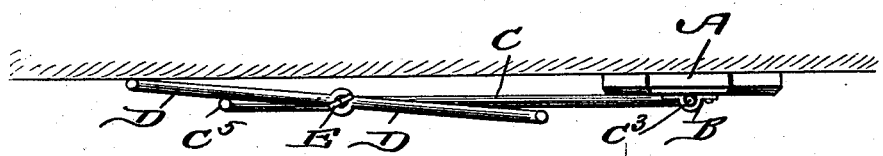
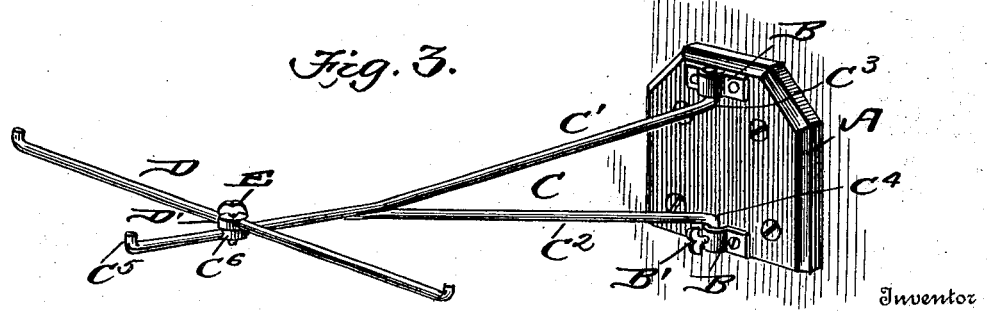

No. 754,982. Patented March 22, 1904.

UNITED STATES PATENT OFFICE.

JENNIE A. EDWARDS, OF SAN FRANCISCO, CALIFORNIA.

HEATING DEVICE.

SPECIFICATION forming part of Letters Patent No. 754,982, dated March 22, 1904.

Application filed July 16, 1903. Serial No. 165,815. (No model.)

*To all whom it may concern:*

Be it known that I, JENNIE A. EDWARDS, a citizen of the United States, residing at San Francisco, in the county of San Francisco and State of California, have invented a new and useful Heating Device, of which the following is a specification.

This invention is an improved construction of bracket or support for the purpose of holding the receptacles above one or more ordinary lamps or lamp-stoves; and the object of the invention is to provide an exceedingly cheap and simple appliance which can be attached to the wall or any fixed object and which can be swung around over a table when ready for use and which can be folded close against the wall when not in use.

With these objects in view the invention consists in the novel features of construction hereinafter fully described, and pointed out in the claim.

In the drawings forming a part of this specification, Figure 1 is a perspective view showing the practical application of my invention. Fig. 2 is a top plan view showing the device folded close to the wall. Fig. 3 is a perspective view showing the device ready for use.

In carrying out my invention I employ a board A, which is rigidly secured to the wall or other fixed object by screws or nails. Clips B are secured to the board A adjacent its upper and lower ends, said clips being intended to receive the ends of the bracket C, said bracket being bifurcated, the upper member C' having its upturned end $C^3$ fitting in the upper clip, while the lower member $C^2$ has its downwardly-bent end $C^4$ fitting in the lower clip B, and a set-screw B' passes through this lower clip for the purpose of locking the bracket in its adjusted position. The outer end of the bracket is turned upwardly, as shown at $C^5$, so that the bail or handle of a bucket or other receptacle may be safely hung thereon. The bracket C is also formed with a boss $C^6$, having a threaded aperture. D indicates a cross-arm which is formed with a boss D', which is adapted to rest upon the boss $C^6$, and this boss D' also has a threaded aperture and a binding-screw E, working in these threaded apertures, serving to securely bind the bracket-arm and cross-arm together in any desired position, and by loosening the screw E and screw B' the entire device can be moved into any desired adjustment and then secured by tightening the screws. By means of a device such as herein shown and described three receptacles can be suspended at one time.

Having thus fully described my invention, what I claim as new, and desire to secure by Letters Patent, is—

A device of the kind described consisting of a board having clips, and a set-screw passing through one of said clips, a bracket-arm bifurcated and having the rear ends of each member turned in opposite directions and adapted to engage the clips, said bracket-arms having a boss, a cross-arm having a boss, and the binding-screw passing through the bosses, substantially as described.

JENNIE A. EDWARDS.

Witnesses:
   L. B. EDWARDS,
   E. E. EDWARDS.